M. M. McINTYRE.
VEHICLE SPRING SUSPENSION.
APPLICATION FILED DEC. 7, 1916.
1,363,800.
Patented Dec. 28, 1920.
2 SHEETS—SHEET 1.
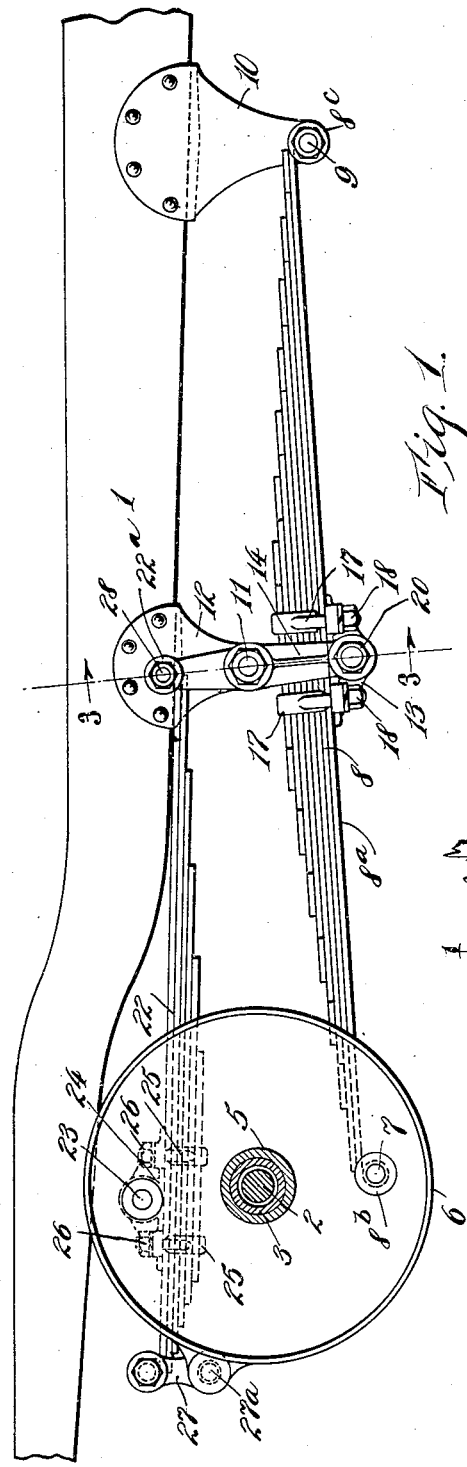
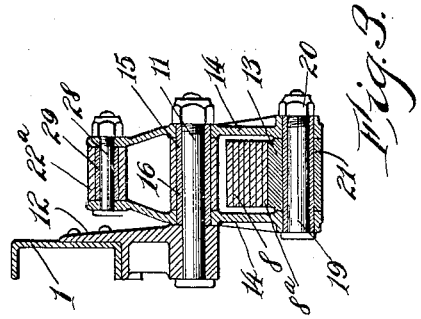
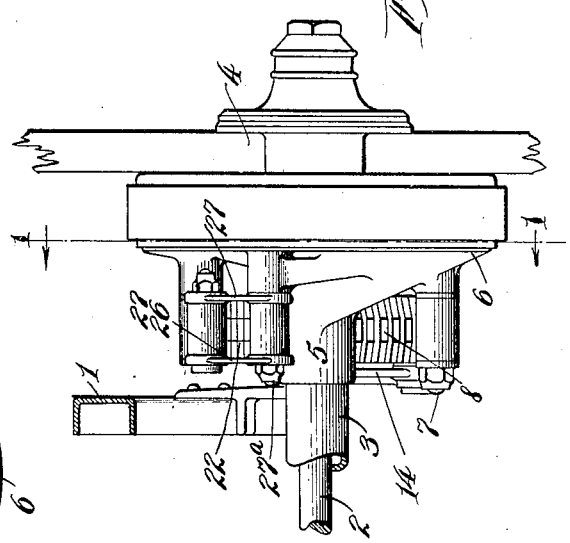
Inventor,
Michael M. McIntyre,
By Hull, Smith, Buck & West.
Attys.

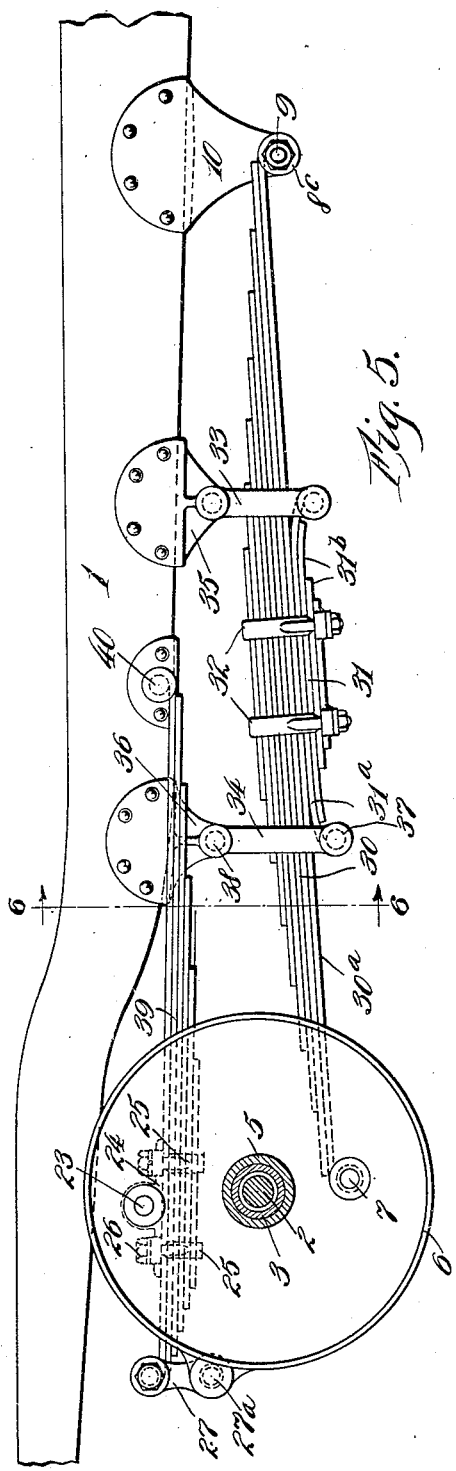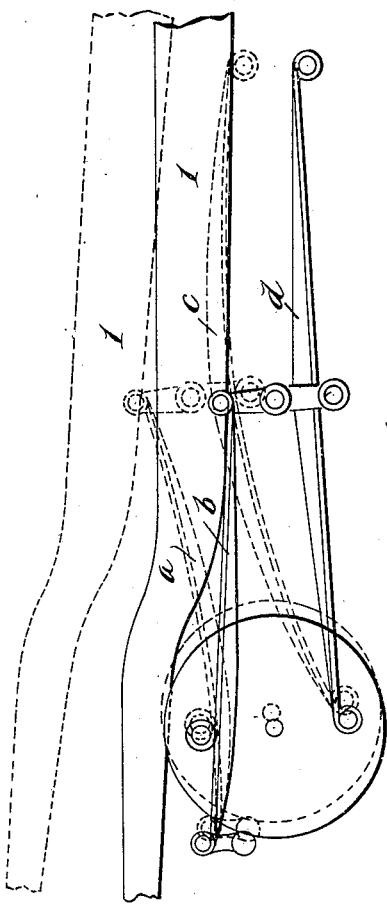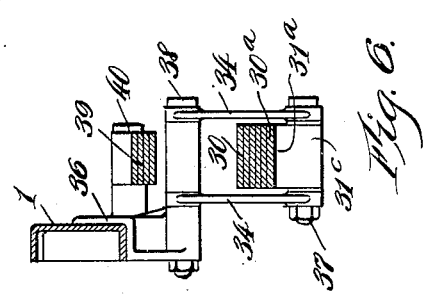

UNITED STATES PATENT OFFICE.

MICHAEL M. McINTYRE, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

VEHICLE SPRING SUSPENSION.

1,363,800.  Specification of Letters Patent.  Patented Dec. 28, 1920.

Application filed December 7, 1916. Serial No. 135,523.

*To all whom it may concern:*

Be it known that I, MICHAEL M. McINTYRE, a citizen of the United States, residing at Cleveland, in the county of Cuyahoga and State of Ohio, have invented a certain new and useful Improvement in Vehicle Spring Suspension, of which the following is a full, clear, and exact description, reference being had to the accompanying drawings.

This invention relates to vehicle spring suspensions, and has for its general object to provide a mode of suspension which, while useful in other types of vehicles, is designed with particular reference to motor driven vehicles. It is the general purpose and object of this invention to provide a construction and mode of suspension wherein the driving, reversing and braking torque will be taken by the springs and wherein the driving torque is taken care of in a particularly efficient manner. A further object of the invention is to secure the foregoing results without impairing the riding and driving qualities of the springs. In the case of cantaliver springs, the drive will be through the forward ends of the springs and the forward driving torque will be absorbed by special or torque springs only, whereas the reversing and the braking torque will be taken on both the cantaliver and the torque springs. Further objects of the invention are to greatly diminish the torque stresses on the tubes or housings for the rear axles; and to secure these results in such manner as to eliminate the excessive angle on the rear universal joint as well as to greatly reduce the side sway of the body with respect to the frame or chassis.

In the embodiment of the invention disclosed herein, these results are secured in and through a pair of cantaliver springs, each of which is connected at one end to an axle member, (preferably the brake support), and at its opposite end to the vehicle frame, there being a pair of special torque springs each of which is also connected to the brake support and to the frame, the latter springs being pre-loaded to a pressure at least equal to the maximum driving torque reaction exerted upon the brake support.

In the drawings forming part hereof, Figure 1 represents a side elevation of the rear portion of the frame of a motor-driven vehicle, showing the springs connected to the brake drum, the axle, housing and a portion of the hub being shown in section, the section corresponding to the line 1—1 of Fig. 2, looking in the direction of the arrows; Fig. 2 a rear elevation of a portion of the rear wheel and of the hub, axle, and brake drum, showing the manner of connecting the springs to the brake drum, the frame being shown in section; Fig. 3 a sectional view corresponding to the line 3—3 of Fig. 1; Fig. 4 a diagrammatic view, similar to Fig. 1, illustrating the operation of the spring suspension; Fig. 5 a view, similar to Fig. 1, of a modified form of the invention; and Fig. 6 a sectional view corresponding to the line 6—6 of Fig. 5.

Describing by reference characters the various parts illustrated herein, 1 denotes one of the side members of the frame of a motor-driven vehicle, 2 the rear axle section corresponding to said side, and 3 the rear axle housing. 4 denotes the rear wheel generally, and 5 the hub of a brake support 6. Below the center of the brake support, there is provided a pin 7 on which is mounted the eye $8^b$ at the rear end of the main plate $8^a$ of a cantaliver spring 8. At its forward end, the spring 8 is rigidly connected to the side member 1 by means of a pin 9 carried by a bracket 10 and on which pin the eye $8^c$ of said main plate is mounted.

At its central portion, the spring 8 is suspended from a pin or bolt 11 carried by a bracket 12 secured to the side member 1. The central portion of the spring rests upon a seat 13 which is carried by the lower ends of a pair of arms 14 pivoted intermediate of their ends to the pin or bolt 11, there being a bushing 15 surrounding the pin and on which the arms 14 are adapted to rotate. A spacing sleeve 16 is shown as interposed between the arms 14, said sleeve surrounding the bushing. The spring 8 is secured to the spring seat 13 by means of the usual clips 17 and nuts 18. The seat 13 is shown as formed separately from the arms 14 and may be secured to the lower ends of said arms by means of a pin or bolt 19 having a nut 20 thereon, there being a bushing 21 surrounding said pin or bolt.

22 denotes the combined torque and load-carrying spring to which reference has been made hereinbefore. This spring is of the semi-elliptic type but is of special shape, the rear end of the spring being short as compared with the forward end thereof. This spring is pivotally connected at its body portion, or thickest portion, to a pin 23 projecting inwardly from the inner surface of the brake support, the pins 7 and 23 being preferably in a common diameter of said support and also being preferably equidistant from the center of the same. The spring 22 is pivotally connected to the pin 23 by means of a spring seat 24, which is journaled on said pin, and by the usual clips 25 extending through said seat and serving to clamp the spring thereto by means of the nuts 26. The short rear end of the spring 22 is connected to the rear side of the brake support by means of the shackles 27, which are pivoted to a pin 27$^a$ carried by the support, the main plate of said spring being connected to the shackle pin in the usual manner.

The forward end of the spring 22 is connected to the upper ends of the arms 14 by means of the pin 28 and bushing 29, extending through the eye 22$^a$ of the main plate.

As shown in Fig. 1, the spring 22 is substantially straight. However, this is because of the fact that it has been pre-loaded by a part of the weight of the vehicle body and frame. In practice, the spring 22 will be given a camber which, when the spring is connected to the vehicle frame, will cause it to be straightened or deflected in the manner indicated in the drawings—see particularly Fig. 4. In this view, the position of the spring 22 prior to connecting the side member 1 thereto is shown in broken lines at $a$, the parts being in the relative positions which they occupy just before the spring is subjected to the weight of the vehicle body and frame. Under this weight, the spring is deflected to the full-line position indicated at $b$, and the axle, brake support, and other connected parts are thereby moved rearwardly. The position of the spring 8 prior to subjecting it and the spring 22 to the weight of the vehicle body and frame is indicated in broken lines at $c$; its position when subjected to such weight is represented in full lines at $d$. When the springs are connected, the frame, axle, brake support and connected parts will assume the positions shown in full lines in Fig. 4—that is to say, with the springs 8 and 22 substantially straight and with the spring 22 pre-loaded to a definite extent by the weight of the vehicle body and frame. In actual practice, the spring 22 will preferably be pre-loaded an amount at least equal to the maximum driving torque which will be exerted thereupon by the brake support at a given radius, whereby the driving torque will be entirely absorbed by the spring 22, with the result that this torque will not be absorbed by the spring 8, leaving the latter spring free to exercise its driving functions unimpeded by such torque. In addition to absorbing the torque, the spring 22 assists in carrying the load of the vehicle and its occupants and in driving the vehicle, and to this extent the torque springs assist the main cantaliver springs 8 in their carrying and driving functions.

It will be understood, of course, that the springs 8 and 22 and the mode of connecting the same to the brake support and frame will be duplicated on the opposite side of the vehicle from that illustrated herein.

With the parts constructed and arranged as described, when driving effort is applied to the wheels, the tendency of the axle section on the right-hand side of the vehicle is to rotate in an anti-clock-wise direction around its axis. Inasmuch as the cantaliver spring 8 has been deflected by the load, to the substantially straight position shown in the drawing, the distance between the points 7 and 9 can change only as the load is applied or released unless there is a relative movement of the point 7, due to the driving torque. This driving torque, therefore, tends to change the camber of the cantaliver spring somewhat, and to place the torque spring 22 under tension between the points 23 and 28. This tendency, however, is overcome by the pre-loading of the torque spring.

On applying the brakes, or on reversing the drive, the action just described is reversed; there will be a tendency for the brake drum to rotate in a clock-wise direction, thereby to place the cantaliver spring under tension and the torque spring under compression. The braking and reversing torque will be absorbed by both the cantaliver and the torque springs.

As greater loads are applied to the car, the torque spring is deflected, increasing its pre-load and enabling it to absorb a correspondingly increased amount of torque, due to the greater turning effort necessary to overcome the inertia of such added load.

In this construction, the drive is at the forward end of the cantaliver spring, and not at the center—as is usual in cantaliver spring suspension—and as the torque spring is in tension between the points 23 and 28, the drive will be at all times through the cantaliver spring 8 at the point 9 where it is attached to the frame.

In the spring suspension shown and described herein, the springs perform the joint functions of carrying and driving; the driving torque—absorbing function, however, is performed only by the special torque springs, hence the riding qualities are not impaired as is the case with the ordinary semi-elliptic spring suspension, where the springs are required to take care of both the driving torque and the carrying of the load. Where this double duty is imposed upon the spring, it must naturally be made to carry a higher rate of deflection than if its functions were only to carry the load and to drive, since the necessity for taking care of the driving torque imposes upon the spring a correspondingly higher rate of deflection, thereby increasing the period of oscillation and impairing the riding qualities. Furthermore, where a spring of the semi-elliptic type is required to take torque, the spring seat must be integral with the axle member. As torque is applied, a torsional strain is set up at the axis of the spring seat, allowing the rear end of the spring to release its load and momentarily throwing the entire torque and vertical load on the forward end of the spring only, causing what is known to the trade as "chattering." This cannot occur in a spring suspension of the type disclosed herein, as the torque spring is preloaded to a pressure at least equal to the driving torque reaction.

An inspection of Fig. 4 will show that, because of the manner of constructing and connecting the springs to the vehicle frame, the amount of vertical deflection of the frame is comparatively small, with a correspondingly small angle of vertical deflection for the universal joint.

In Fig. 5 of the drawing there is shown a modification of the invention wherein the central portion of the cantaliver spring has a free swinging connection with the frame. In this view, the parts 1 to 7 and 9 and 10 inclusive are identical with the like-designated parts in Figs. 1, 2 and 3. The main or cantaliver spring, indicated generally at 30, is connected through its main plate 30ª to the bolts or pins 7 and 9, as described hereinbefore. At its center, however, it is provided with an auxiliary spring 31 comprising a main plate 31ª having its ends curved away from the main plate 30ª and having one or more auxiliary plates 31ᵇ. The main cantaliver spring 30 and the auxiliary spring 31 are connected by means of the usual clips 32. The spring as a whole is suspended at its central portion from the side member 1 by means of shackles 33 and 34 connected respectively to pins carried by brackets 35 and 36 depending from the member 1 and having their lower ends connected to the eyes of the main plate 31ª of the auxiliary spring in the usual manner. The shackle links 34 extend on opposite sides of the main spring 30. This is illustrated in detail in Fig. 6, the eye 31ᶜ of the plate 31ª being shown as supported by a pin 37 extending therethrough and connected to the lower ends of the shackle links 34 in the usual manner. 38 denotes the pin or bolt carried by the bracket 36 supporting the upper ends of the shackles 34. This same construction will be employed in connection with the shackles 33 at the opposite end of the plate 31ª.

The torque spring 39 is connected to the pin 23 carried by the brake support through the spring seat and clips 24 and 25 in the same manner as in the case of the torque spring 22. At its rear end it is connected to the brake drum through the pin 27ª and shackles 27, as in the case of the preceding modification. At its front end, however, it is connected to a bolt or pin 40 projecting laterally from the side member 1, instead of being connected thereto by lever arms as is the case with the preceding modification.

In the construction shown and described in Figs. 5 and 6, it will be seen that the load is divided between opposite ends of the auxiliary spring 31 through the shackles 33 and 34 and that the total load is carried at the central portion of the main spring, the drive being at the forward end of the main spring as before. In this modification, the pivotal point for the rear portion of the body is at the axis of the axle instead of at the central portion of the spring as is the case where the spring is trunnioned at such point; but the movement of the pivot is practically negligible because of the action of the torque spring. The nearer the pivotal point of oscillation is to the center of the rear wheels, the less will be the oscillation of the mass—that is to say of the vehicle body and frame. This construction is not open to the objection of having a long overhang of unsupported load at the rear of the pivotal point of oscillation.

Reference has been made to the reduction of side-sway by the invention disclosed herein. This reduction is due to the fact that the lateral movements of the vehicle body are apportioned on each side between two springs (the main cantaliver spring and the torque spring), which are advantageously located for that purpose.

Having thus described my invention, what I claim is:

1. The combination, with an axle member and a vehicle frame, of a spring connected at one end to said axle member and having a driving connection with the frame at its opposite end, a swinging connection between the intermediate portion of said spring and said frame, and a second spring connected to said axle member at longitudinally spaced portions thereof and having a driving connection with said frame.

2. The combination, with a brake support and a frame, of a spring having one end connected to said brake support at one side of the axis thereof and having a driving connection between its opposite end and said frame, a second spring pivotally connected at a point intermediate the ends thereof to the brake support and on the opposite side of the axis thereof from the first mentioned spring, a flexible connection between one end of the second spring and the brake support, and a driving connection between the opposite end of the second spring and the frame.

3. The combination, with an axle member and a frame, of a spring having one end connected to said member at one side of the axis of the axle and having a driving connection between its opposite end and said frame, a second spring pivotally connected at a point intermediate the ends thereof to the axle member and on the opposite side of such axis from the first mentioned spring, a flexible connection between one end of the second spring and the axle member, a driving connection between the opposite end of the second spring and the frame, and a swinging connection between the intermediate portion of the first mentioned spring and the frame.

4. The combination, with an axle member and a frame, of a spring having one end thereof connected to the axle member and a driving connection between its opposite end and the frame, a second spring pivotally connected intermediate of its ends to said axle member and having one of its ends flexibly connected to said member, and a driving connection between the opposite end of the second spring and the frame.

5. The combination, with an axle member and a frame, of a spring having a driving connection between one end thereof and said member, a driving connection between its opposite end and the frame, and a yielding connection between its intermediate portion and the frame, and a second spring having a yielding connection between one end thereof and said axle member, a driving connection between an intermediate portion thereof and said member, and a driving connection between its opposite end and the frame.

6. The combination, with an axle and a frame, of a brake support concentric with said axle, a spring having a driving connection between one end thereof and the brake support at a point below said axle, a driving connection between its opposite end and the frame, and a yielding connection between its intermediate portion and the frame, and a second spring having a yielding connection between one end thereof and the upper portion of the brake support, a driving connection between an intermediate portion thereof and the upper portion of the brake support, and a driving connection between its opposite end and the frame.

7. The combination, with an axle and a vehicle frame, of a member extending in opposite directions from the axle and disconnected therefrom, a spring having a driving connection between one end thereof and the axle member at one side of the axle, a driving connection between its opposite end and the frame, and a yielding connection between an intermediate portion thereof and said frame, and a second spring yieldingly connected at one end to said member and having a driving connection between an intermediate portion thereof and said member and on the opposite side of the axle from the driving connection for the first spring, and a driving connection between the opposite end of the second spring and the frame.

In testimony whereof, I hereunto affix my signature.

MICHAEL M. McINTYRE.